United States Patent
Girardier et al.

(10) Patent No.: US 11,516,272 B2
(45) Date of Patent: *Nov. 29, 2022

(54) METHOD OF IMPROVING SYNCHRONIZATION OF THE PLAYBACK OF AUDIO DATA BETWEEN A PLURALITY OF AUDIO SUB-SYSTEMS

(71) Applicant: Google LLC, Mountain View, CA (US)

(72) Inventors: Thomas Girardier, Poisy (FR); Julien Goupy, Le Mesnil-Saint-Denis (FR); Matthieu Guesnerot, Paris (FR)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/757,726

(22) PCT Filed: Oct. 5, 2018

(86) PCT No.: PCT/EP2018/077082
§ 371 (c)(1),
(2) Date: Apr. 20, 2020

(87) PCT Pub. No.: WO2019/076645
PCT Pub. Date: Apr. 25, 2019

(65) Prior Publication Data
US 2021/0194944 A1 Jun. 24, 2021

(30) Foreign Application Priority Data
Oct. 20, 2017 (EP) .................................. 17306431

(51) Int. Cl.
*H04L 65/75* (2022.01)
*H04W 4/80* (2018.01)
(Continued)

(52) U.S. Cl.
CPC .............. *H04L 65/75* (2022.05); *G06F 3/162* (2013.01); *H04N 21/43076* (2020.08); *H04W 4/80* (2018.02); *H04W 84/12* (2013.01)

(58) Field of Classification Search
CPC ...... H04L 65/601; H04W 4/80; H04W 84/12; G06F 3/162
See application file for complete search history.

(56) References Cited

U.S. PATENT DOCUMENTS 6,973,058 B2 * 12/2005 Paryani ............. H04L 29/06027
370/329
7,035,235 B2 * 4/2006 Jose ..................... H04B 7/2615
370/330
(Continued)

OTHER PUBLICATIONS

Trainor et al., "Providing an Immersive Gamin Experience Using Wireless Low-Latency COded Audio Streaming", AES 41st International Conference, London, UK , Feb. 2, 2011.*
(Continued)

*Primary Examiner* — Todd L Barker
(74) *Attorney, Agent, or Firm* — Kilpatrick Townsend & Stockton LLP

(57) ABSTRACT

A method of synchronizing sub-systems each including a master device and at least one slave device connected to the master device via Bluetooth for playback by the at least one slave device of audio data. The method includes collecting respective internal latency data of the sub-systems, determining, based on the internal latency data of the plurality of sub-systems, respective delays to be applied by the sub-systems between reception of the audio data and playback of the audio data by the slave devices of the sub-system, and, by each sub-system, applying the corresponding delay for playback of the audio data.

16 Claims, 2 Drawing Sheets

(51) Int. Cl.
*G06F 3/16* (2006.01)
*H04N 21/43* (2011.01)
*H04W 84/12* (2009.01)

(56) References Cited

U.S. PATENT DOCUMENTS

| | | | | |
|---|---|---|---|---|
| 7,082,285 | B2* | 7/2006 | Linde | G06F 9/4812 |
| | | | | 455/41.2 |
| 9,457,281 | B1* | 10/2016 | Lam | A63H 33/00 |
| 9,666,424 | B1* | 5/2017 | Veloz | A61L 2/10 |
| 9,928,024 | B2* | 3/2018 | Sundaresan | H04L 65/80 |
| 2006/0094359 | A1* | 5/2006 | Kim | H04W 48/20 |
| | | | | 455/41.1 |
| 2006/0274704 | A1* | 12/2006 | Desai | H04W 72/1215 |
| | | | | 370/338 |
| 2008/0125037 | A1* | 5/2008 | Ibrahim | H04W 4/18 |
| | | | | 455/41.2 |
| 2009/0010283 | A1 | 1/2009 | Lin et al. | |
| 2011/0235621 | A1* | 9/2011 | Ko | H04W 72/1215 |
| | | | | 370/338 |
| 2016/0011748 | A1* | 1/2016 | Zheng | G06F 3/1454 |
| | | | | 345/173 |
| 2016/0044622 | A1* | 2/2016 | Crowe | H04N 21/4302 |
| | | | | 709/231 |
| 2016/0047391 | A1* | 2/2016 | McPherson | F04D 25/088 |
| | | | | 318/504 |
| 2016/0173413 | A1* | 6/2016 | Khare | H04L 49/109 |
| | | | | 370/401 |
| 2017/0076400 | A1* | 3/2017 | Woo | G06F 16/5854 |
| 2017/0277507 | A1* | 9/2017 | Ando | G06F 3/165 |
| 2017/0353937 | A1* | 12/2017 | Tanaka | H04H 20/18 |
| 2019/0200057 | A1* | 6/2019 | Chang | H04N 21/6125 |

OTHER PUBLICATIONS

Rottondi et al., "An Overview on Networked Music Performance Technologies", Dec. 5, 2016.*
Kiselev et al., "WHISPER:Wirelessy Synchronized Distributed Audio Sensor Platform", 2017 IEEE 42nd Conference on Local Networks Works, Oct. 9, 2017.*
International Search Report (ISR), dated Nov. 6, 2018, from corresponding International Application No. PCT/EP2018/077082.
Written Opinion of the International Searching Authority (WO-ISA), dated Nov. 6, 2018, from corresponding International Application No. PCT/EP2018/077082.

* cited by examiner

METHOD OF IMPROVING SYNCHRONIZATION OF THE PLAYBACK OF AUDIO DATA BETWEEN A PLURALITY OF AUDIO SUB-SYSTEMS

BACKGROUND OF THE INVENTION

Field of the Invention

The invention relates to the field of audio playback using a system which receives audio data and which includes a plurality of sub-systems each having a master device adapted to receive the audio data and to forward them (all or in part) to one or more slave device in communication therewith by Bluetooth and which are adapted to effectively playback the audio data they received.

Description of the Related Art

The employ of such systems is of high interest in certain contexts, for instance when one requires a refined coverage of a given facility using Bluetooth devices or the like as speakers for playing desired audio data.

In fact, such systems are highly adaptable.

However, converging towards an appropriate synchronization of the audio data between the various speakers is a complex problem.

The invention seeks to improve the synchronization of the sub-systems together, which positively affects the overall synchronization of the playback of the audio data by the global system.

BRIEF SUMMARY OF THE INVENTION

To this end, the invention relates to a method of synchronizing a system adapted to receive a stream of audio data and playback the audio data, the system comprising a plurality of sub-systems each comprising a master device and at least one slave device connected to the master device through a Bluetooth usage, each master device being configured to receive all or part of the audio data and send the received audio data to the at least one slave device through said Bluetooth usage for playback by the at least one slave device, the method comprising:

(a) obtain respective internal latency data of the sub-systems, the internal latency data of a given sub-system being representative of an internal latency of the sub-system which corresponds to a response time between reception of the audio data by the sub-system and playback of the audio data by the at least one slave device, (b) based on the internal latency data of the plurality of sub-systems, determining respective delays each to be applied by a given sub-system between reception of the audio data and playback of the audio data by the at least one slave device of the sub-system, (c) by each sub-system, applying the corresponding delay for playback of the audio data.

According to an embodiment, the system is configured to receive the stream via a Wi-Fi connection.

According to an embodiment, the internal latency of at least one sub-system observes the following relationship:

$$l_i = \max_j(l_{ij}) + R_i$$

where $l_i$ is the internal latency of the sub-system of index i, $l_{ij}$ is an internal latency of the slave device of index j within the sub-system of index i and which corresponds to a response time of said slave device between reception of a stream of audio data and playback of the audio data by the slave device, and $R_i$ is a chosen constant which is positive or null.

According to an embodiment, steps a, b and c are repeated overtime, whereby the internal latency data and the delays are updated.

According to an embodiment, the master devices are synchronized together.

According to an embodiment, within a given sub-system which includes a plurality of slave devices, the communications of the audio data to the slave devices are synchronized so that the playback of the audio data by the slave devices is synchronized between the slave devices.

According to an embodiment, for a given sub-system, the delay is determined by the relationship:

$$d_i = \max_j(l_j) - l_i + R,$$

where i is the index of the considered sub-system, $d_i$ is the delay of the considered sub-system, $l_j$ is the internal latency of the sub-system of index j, and R is a constant having a positive or null value.

The invention also relates to a computer program comprising instructions for the implementation of the method as defined above when executed by a processor.

The invention also relates to a system adapted to receive a stream of audio data and playback the audio data, the system comprising a plurality of sub-systems each comprising a master device destined to be connected to at least one slave device through a Bluetooth usage, each master device being configured to receive all or part of the audio data and send the received audio data to the at least one slave device through said Bluetooth usage for playback by the at least one slave device, the system further comprising a synchronization module configured to:

a. obtain respective internal latency data of the sub-systems, the internal latency data of a given sub-system being representative of an internal latency of the sub-system which corresponds to a response time between reception of the audio data by the sub-system and playback of the audio data by the at least one slave device, and b. based on the internal latency data of the plurality of sub-systems, determining respective delays each destined to be applied by a given sub-system between reception of the audio data and playback of the audio data by the at least one slave device of the sub-system.

According to an embodiment, all or part of the synchronization module is located in at least one master device.

According to an embodiment, the synchronization module includes a plurality of synchronization sub-modules each configured to collect the internal latency data of all the sub-systems and determine the delay of one or more of the sub-systems.

According to an embodiment, the synchronization module is located in one place.

According to an embodiment, at least one sub-system is remote from the synchronization module, the synchronization module being configured to communicate with the master device of said sub-system for collecting the internal latency data of the sub-system and for providing the master device with the delay associated to said sub-system.

BRIEF DESCRIPTION OF THE DRAWINGS

Other features and advantages of the invention will become apparent from the following description provided for indicative and non-limiting purposes, with reference to the accompanying drawings, wherein.

DETAILED DESCRIPTION OF THE PREFERRED EMBODIMENTS

Figure 1:
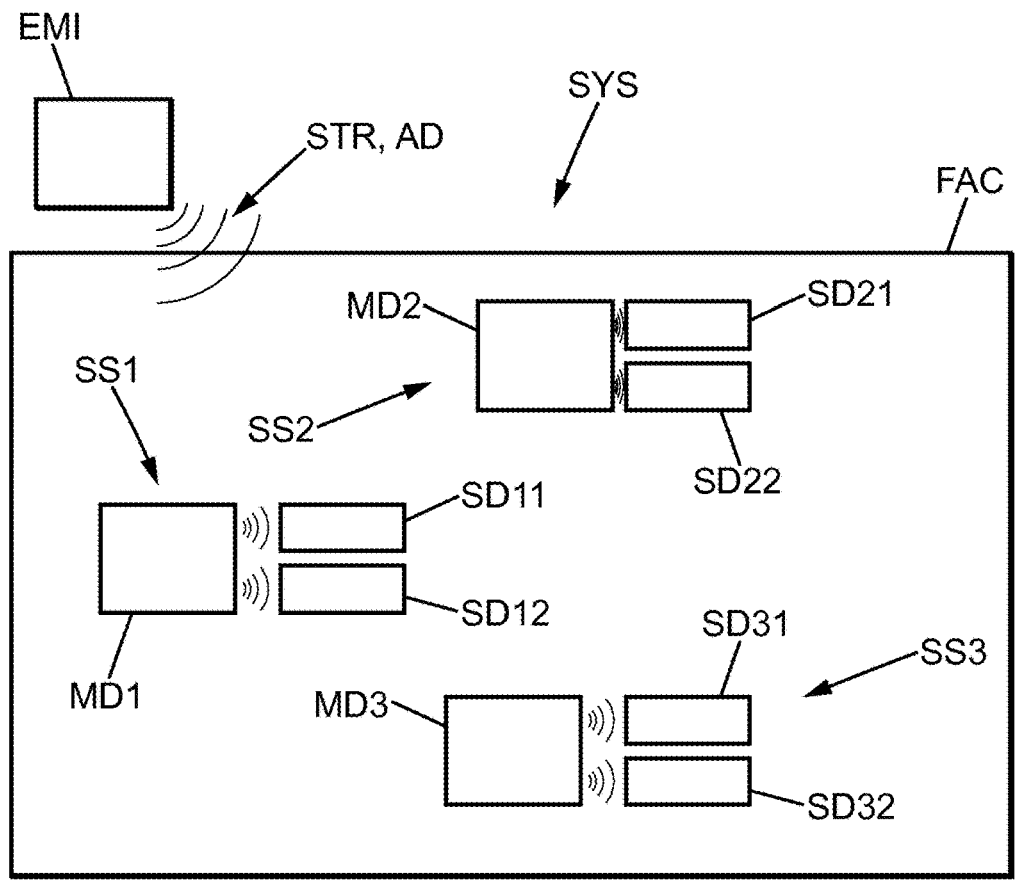
FIG. 1 illustrates a system according to the invention.

FIG. 1 illustrates a system SYS according to the invention.

The system is an audio system. It is configured to receive a stream STR of audio data AD and to playback the audio data, i.e. transform the audio data into audible sounds of which the audio data are representative. Preferably, in the context of the invention, the audio data correspond to sounds which are audible for the human ear. They may correspond to music, a conversation, a speech, sounds and/or music associated to a movie, etc.

The audio data AD are typically in an encoded form within the audio stream, for instance according to any known encoding process.

The stream STR may be generated by an emitter EMI, for instance located in the vicinity of the system. The emitter may form part of the system SYS. Alternatively, it may be external to the system SYS.

The emitter EMI may be any device, for instance an electronic device such as a smartphone, a smart tablet, a laptop computer, a desktop computer, etc.

The stream STR is conveyed to the system according to one or more communication technology. In the context of the invention, the stream STR is advantageously received by the system SYS wirelessly. Advantageously, it is so via a Wi-Fi communication, the emitter EMI and the system SYS thus communicating using this technology.

As is known, Wi-Fi is a communication technology which is a radio-based technology designed according to the IEEE 802.11 specifications, IEEE standing for Institute of Electrical and Electronics Engineers.

The system SYS is itself advantageously arranged within a given facility FAC, such as a house, a conference room, and the like, and is thus intended to make the audio data audible for persons located in the facility FAC.

Still in reference to FIG. 1, the system SYS comprises a plurality of sub-systems SSi, where i is the index of the corresponding sub-system, and, according to the invention, it includes a synchronization module SYNC (FIG. 2) configured to synchronize the various sub-systems SSi together.

Regarding the sub-systems SSi, in FIG. 1, three such sub-systems SS1, SS2, SS3 are shown.

Each sub-system SSi is configured to receive all or part of the audio data AD and play all or part of the received audio data, i.e. make them audible for human ears.

To this end, each sub-system SSi comprises a master device MDi and at least one slave device SDij in communication with the master device MDi, where j is the index of the considered slave device.

Each master device MDi is configured to receive the audio data, preferably in the form of the stream STR itself or in the form of a stream generated based on the stream STR.

For instance, each master device MDi is placed in a location that the stream STR reaches while retaining a usable form, in particular in terms of signal power.

Alternatively, in some embodiments, the system SYS may include one or more device which is specifically configured to receive the audio data AD and forward them using a stream generated based on the stream STR to one or more master device MDi. This may be done by a master device MDi. Therefore, the corresponding master device(s) act as a Wi-Fi repeater in case a Wi-Fi connection is used.

Alternatively or in parallel, this may be done by a device other than a master device or a slave device. In some embodiments, this may be done using a device which is external to the system.

In addition, the master devices MDi are configured to forward all or part of the audio data AD they receive to the slave devices SDij of the sub-system SSi for playback back by the latter.

It should be noted that a given sub-system may receive only part of the audio data AD, for instance that pertaining to one or more specific channels of the audio data. As such, it plays only part of the audio data AD. This means that the audio data received by a given sub-system may be different from the data received by another sub-system and/or that the sounds played by a given sub-system may be different from that of another sub-system.

Moreover, a given slave device SDij may receive only part of the audio data which were received by the master device MDi, as it may be destined to only play part of these data, all or part of the remaining data being for instance destined to be played by the other slave devices. This means in particular that two slave devices of a given sub-system may receive different audio data and/or that the sounds played by each are different. For instance, one may receive the audio data of a first channel, such as a left channel, and another one that of another channel, such as a right channel.

In the context of the invention, the audio data conveyed to the slave devices by the corresponding master device are preferably conveyed through a Bluetooth usage.

Bluetooth is a communication standard that is well-known to the person skilled in the art, defined since 1994 and managed by a group of organizations (Bluetooth SIG). Bluetooth enables a short-distance bidirectional exchange of data (this is known to define a piconet network, which designates a network covering a personal zone). Bluetooth uses radio waves that are situated in the UHF band (between 300 MHz and 3 GHz).

By "Bluetooth usage", it is understood that the communications are based on the Bluetooth standard. In particular, it may rely on an existing version of the standard. Moreover, it may rely on versions thereof to be released in the future. The communications for instance conform to the standard. Alternatively or in parallel, some or all of them may rely on the Bluetooth standard for which one or more protocols have been modified, for instance so as to create a point-to-multipoint link between a master device MDi and a plurality of slave devices SDij within a given sub-system. This is detailed here below.

Although Bluetooth is preferred, the invention also applies to any communication technology allowing short distance, wireless bidirectional communications between the master device and the slave device(s) of a given sub-system. For instance, the distance in question is inferior to few tens of meters.

Advantageously, in the context of the invention, the master devices MDi of the various sub-systems are further configured to synchronize together.

For instance, this implemented through the exchange of time data between the master devices MDi, the time data for instance including time stamps which are indicative of the internal times of the master devices provided by an internal clock thereof. For instance, to synchronize two master devices, they exchange time data, and, based on these data, one of them or both compute the time difference between its internal clock and that of the other device as well as the transmission delay, and proceeds accordingly.

Figure 2:
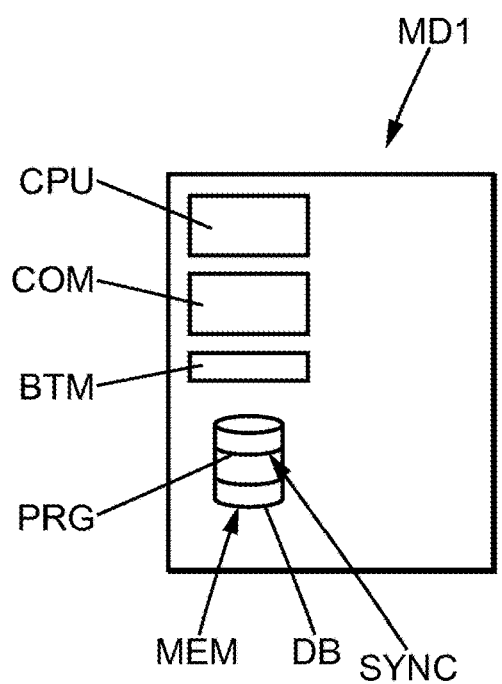
FIG. 2 illustrates a master device of the system of FIG. 1.

To the end of carrying out these functions, in reference to FIG. 2, each master device MDi includes a communication module COM, a Bluetooth Module BTM, a memory MEM and a processing module CPU.

The communication module COM is configured to allow communications between the master device MDi and the emitter EMI, and between the master device MDi and the other master devices $MD_{k\neq i}$.

To this end, the communication module COM is configured to support the communication technology which is employed by the emitter for the stream STR, which may be done by Wi-Fi, as indicated above.

However, any other technology may be used, whether wire-based or wireless-based.

In a general sense, in the context, preferably, the communications between the emitter and the master device MDi and between the master devices are carried out using a technology other than Bluetooth. As such, the system is hybrid, in that it uses different communication technologies.

The technology used by the master device MDi to communicate with the other master devices $MD_{k\neq i}$ may be different from that which is used between the master device MDi and the emitter. Alternatively, it may be identical. As indicated above, however, advantageously, it is identical, and the master device may then be adapted to act as a repeater to forward the stream STR to one or more of the other master devices $MD_{k\neq i}$.

It should be noted that the master devices may implement a plurality of technologies to communicate together, a pair of master device using a first technology, at least another pair using a different technology.

The Bluetooth module BTM is configured to handle the communications with the one or more slave devices SDij of the considered sub-system through a Bluetooth usage.

The Bluetooth module BTM may have any structure, and for instance includes one or more Bluetooth chip. It may also include one or more processing component, which may be shared with the processing module CPU or not.

Advantageously, in the context of the invention, at least one sub-system SSi includes at least two slave devices, the Bluetooth module BTM of the corresponding sub-system being configured to communicate the audio data AD destined to the associated slave devices SDij to these slave devices through a usage of Bluetooth configured for a synchronized playback of the audio data by the slave devices.

By "synchronized", it is to be understood that at given time, the respective sounds which are played by the slave devices SDij of the considered sub-system SSi all correspond to audio data associated to a same instant of the audio data. They may be different and synchronized nonetheless.

To this end, the Bluetooth module may include a plurality of Bluetooth chips each dedicated to managing the communications with one of the slave devices SDij.

However, preferably, it includes a single Bluetooth chip configured to create a point-to-multipoint link with the slave devices SDij and to stream the audio data AD associated thereto to the slave devices SDij using multimedia streams each intended for one of the slave devices SDij. Preferably this is done based on a non-blocking Bluetooth usage.

Non-blocking Bluetooth usage is understood to refer to any Bluetooth programming (by a Bluetooth mode and/or by other Bluetooth parameters) that prevents the Bluetooth chip from blocking the piece of equipment which controls the slave devices (the processing module CPU for instance). Therefore, a non-blocking Bluetooth usage is a Bluetooth usage that prevents forcing the Bluetooth chip from retransmitting an unreceived packet as long as it has not been received, which also prevents forcing such packet to be retransmitted beyond a time at which at least one slave device no longer has data in its buffer memory due to, for example, unsuccessful attempts to retransmit the packet, which monopolizes the Bluetooth communications. A non-blocking usage corresponds to a set of parameters (FTO for Flush Timeout, QoS for Quality of Service, Mode, Extended Flow features) and not only to a mode (such as the SM mode) in the sense of the Bluetooth standard. This is for example the "Flow Control" mode or any other mode for which the "Flush Timeout" parameter is set according to the Bluetooth standard to prevent any retransmission. On the contrary, a blocking usage is a usage that leads to, for example, retransmitting data as long as the data are not received, or that leads to retransmitting data while a higher priority slave device is also waiting for data and has not received the data due to said usage (it is then blocked). The blocking usage may be used to prevent occasional data losses (in the event of prolonged power cuts for a duration longer than a given threshold, the blocking usage is not able to prevent data losses). On the contrary, employing a non-blocking usage prevents the risk that a slave device becomes inaccessible and prevents any data transmission to all slave devices. For example, a slave device can become inaccessible because it was moved out of range of the Bluetooth module BTM, etc.

Advantageously, the master device MDi is configured so that the Flush Timeouts for the various L2CAP channels used to communicate with the slave devices SDij are at the value defined by the Bluetooth standard (i.e., 1, but this can vary according to the implementations) so that no retransmission is performed.

As is known, L2CAP stands for Logical Link Control and Adaptation Protocol, and is a building block of the A2DP, which stands for "Advanced Audio Distribution Profile", which corresponds to the frame defined by the Bluetooth standard according to which the Bluetooth communications of a given Bluetooth chip are structured.

According to an embodiment, the Bluetooth chip is configured when a data packet of the stream that it transmitted to a considered slave device is lost, to resend this packet to said slave device. The Bluetooth chip is configured to determine a fill rate of a buffer memory BUFij (FIG. 3) of at least one of the slave devices SDij of the sub-system and to determine a maximum duration during which it can resend the lost packet to the slave device according to this fill rate.

According to an implementation, this maximum duration is defined by the least filled buffer memory among the buffer memories of all the other slave devices (within the sub-system), for which it must deduce the time necessary for transmitting a sufficient portion of the stream. Therefore the content of the buffer memory of the Bluetooth multimedia device that lost a packet is not taken into account.

According to another implementation, this maximum duration is defined by the least filled buffer memory among the buffer memories of all the slave devices of the sub-system (including the one that lost the packet), for which it must deduce the time necessary for transmitting a sufficient portion of the stream. In fact, if the slave device that lost the packet runs the risk of running out of audio data to play, it can be considered more appropriate to abandon the attempt to retransmit the lost packet, which in any case would be restored as delayed and thus desynchronized from the other slave devices.

According to another implementation, the Bluetooth chip is configured to identify the slave device for which it is unnecessary to verify the fill rate of the buffer memory. For example, the Bluetooth chip can exclude a number n of slave devices in which it powered the buffer memories last, if it can deduce that other slave devices necessarily exist in which the buffer memory is less filled and which will determine the aforementioned maximum duration.

According to another implementation, the Bluetooth chip is arranged to store an identifier of the slave device, the buffer memory of which it powered longest. When a packet is lost, the Bluetooth chip then only verifies the buffer memory of this slave device, the buffer memory of which it powered longest.

According to another implementation, the Bluetooth module BTM is arranged to transmit portions of audio stream corresponding to a block of audio data, for instance which correspond to a duration of 14 ms (which corresponds to the duration of an audio stream block encoded by the SBC codec).

In an example, the Bluetooth module BTM controls four slave devices, and the transmission of a portion of about 14 ms takes about 1.3 ms. Thus it takes about 4*1.3 ms or about 5.2 ms to transmit about 14 ms of stream to the four Bluetooth multimedia devices, which leaves about 14 ms-5.2 ms or about 8.8 ms during which the controlling device can identify the packets that were improperly transmitted or not transmitted and retransmit them.

According to an implementation, the Bluetooth module BTM is arranged to configure the "Flush Timeout" of each L2CAP channel depending on the fill state of the buffer memories of the slave devices. This fill state is for instance estimated beforehand, for instance in a known manner.

In an embodiment, the Bluetooth module BTM is configured to cause the packets on the Bluetooth chip which communicates with one or more slave device of the sub-system to be flushed for a given slave device when it is determined that the packets are not conveyed correctly. For instance, this situation of the packets being incorrectly sent is considered to be detected when the queue of packets to be sent to a given slave device exceeds a predetermined threshold.

So as to obtain a point-to-multipoint configuration for a given Bluetooth chip, for instance, the A2DP profile of the Source SEP (for "Stream end point, in this case the Bluetooth chip) is modified, for example by substituting a conventional AVDTP building block, for Audio/Video Distribution Transport Protocol, for a modified AVDTP' building block, so that the Bluetooth chip is configured to generate a distinct Source SEP for each Sink SEP (corresponding to each slave device that it must control). This configuration corresponds to point-to-point link for each slave device, each slave device being linked to a virtual Source SEP in a same Bluetooth chip to simulate a multiplicity of Source devices where in reality there is only a single Bluetooth chip.

According to another embodiment, the Bluetooth chip is configured to generate a unique SEP to control all the slave devices. More specifically, the A2DP profile of the Source SEP (the Bluetooth chip) is modified, for example by substituting a conventional AVDTP building block for a modified AVDTP' building block. The modification for instance consists in removing restrictions preventing a Source SEP from connecting to more than one Sink SEP.

This principle of modifying the A2DP profile may be seen as a form of extension of the Bluetooth standard, an extension that does not produce difficulties as the Bluetooth standard is not provided to detect such an extension.

In general, the Bluetooth usages used between the slave devices and the corresponding master device may conform to the Bluetooth standard except for the A2DP profile, which is configured for point-to-multipoint communications so as to allow a single Bluetooth chip of the Bluetooth module BTM to handle communications with a or the plurality of slave devices of the sub-systems.

Advantageously, for each sub-system having a plurality of slave devices SDij, the Bluetooth module BTM is configured to send the streams of data to the respective slave devices as a function of the respective internal latencies of the slave devices so that the playback of the associated audio data by these slave devices is synchronized. In other words, the sending of the streams by Bluetooth to the slave devices accounts for the response times of the slave devices so that the respective sounds played by them are synchronized. As before, this means that sounds corresponding to a same instant of the audio data are played simultaneously by the slave devices within the sub-system, regardless of whether they are identical or not. The internal latencies are discussed in more details below.

To this end, for instance, the Bluetooth module BTM is configured to generate at least as many multimedia streams as there are slave devices in the sub-system SSi based on the received stream (for instance the stream STR sent by the emitter EMI). For instance, this generation takes the form of a duplication of all or part of the received stream into at least the corresponding number of streams. In addition, the Bluetooth module BTM is configured to allocate each stream to a given slave device. So as to synchronize the streams, the Bluetooth module BTM then adjusts the timing of the sending of a given stream to the corresponding slave device based on the internal latency of the latter and on that of the other slave devices to obtain the synchronized playback.

As for the memory MEM, it is configured to store programs destined to be executed by the processing module CPU for the operations of the master device MDi.

Advantageously, it is also configured to store a database DB which includes identifiers of possible slave devices which may connect to the master device to operate as speakers, and, for each identifier of a slave device, at least one respective internal latency. The internal latency of a given slave device corresponds to its response time between the input of a stream and the playback of the audio data of this stream by the slave device. This internal latency is a structural characteristic parameter of the slave device. It usually is a function of the internal structure and configuration of the slave device. For instance, typically internal latency values are of about 100 ms, 200 ms, etc.

For instance, to a given slave device corresponds a single identifier.

Moreover, for a given slave device, the database may include a plurality of possible latencies. For instance, each internal latency associated to a given slave device is associated to a specific codec used for encoding and decoding the data exchanged between the master device and the slave device using their Bluetooth link. For all or part of the possible codecs, and for at least one slave device, a plurality of internal latencies may be present in the database DB. In fact, for a given codec, the internal latency of a slave device may vary from one configuration of the codec to another. Various configuration parameters may indeed influence latency, such as the quality of sound, the number of sound channels (e.g. mono, stereo) used, etc. At a given time, the specific codec used for a given slave device SDij and its configuration is known from the master device MDi, whereby this information is accessible to the latter.

Advantageously, the data of the database are provided at least in part by the manufacturers of slave devices. Alternatively or in parallel, the database is filled and/or update based on latency estimation carried out by the system upon connection of a given slave device to a master device. This may be done according to any known process and with a known piece of equipment.

It should be noted that the internal latency of a given slave device may be retrieved based on the identifier through retrieving further information from the slave device, such as the vendor identifier and/or its chip identifier, from which a model identifier is determined and to which one or more internal latencies are associated in the database DB. A selection of the internal latency may thus be carried out from the plurality of internal latencies associated thereto, for instance based on the codec and its configuration, as indicated above.

The memory MEM is furthermore adapted to store a program PRG comprising instructions for the implementation of a method of synchronizing the system SYS according to the invention and which is detailed below.

This program forms all or part of the synchronization module SYNC of the system, detailed below as well.

It may also include one or more program configured for the synchronization of the master devices among themselves, as discussed above.

The memory MEM may take any known form, such as one which includes one or more physical memory modules operatively coupled together.

The processing module CPU is configured to manage the operations of the master device and of its components, typically through the execution of the programs contained in the memory MEM.

It may include one or more processor or the like.

In practice, the master device MDi may correspond to a personal computer, such as a laptop or desktop computer, a smartphone, a smart tv, a tablet, a phablet, an intelligent personal assistant device sometimes referred to as a home device, or the like.

Figure 3:
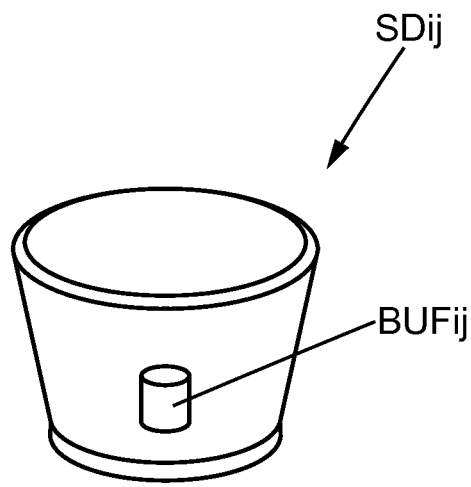
FIG. 3 illustrates a slave device of the system of FIG. 1.

In reference to FIG. 3, each slave device SDij is configured to receive all or part of the audio data AD from the associated master device MDi via Bluetooth (or the corresponding technology communication used between the master device and associated slave devices) and to playback the received audio data AD to make them audible by the audience.

In practice, the slave devices SDij may take the form of speakers. However, they make take the form of any device having a component capable of transducing data into audible sounds, such as a smartphone, a TV, a computer, etc.

The slave devices SDij are for instance of known structure and configuration. As such, they include known modules to perform these functions, in particular a reception module for receiving the audio data, a buffer BUFij to store the audio data, a processing module for decoding the data stored in the buffer, a transducer for converting the decoded data into sounds, a source of electrical energy for powering-up the modules, etc.

As indicated above, they exhibit an internal latency which corresponds to their response time between the input of a stream of audio data therein and the playback of the audio data of this stream by the slave device.

In reference to FIG. 1, as for the synchronization module SYNC, as indicated above, it is configured to synchronize the various sub-systems SSi together for a better synchronization of the playback of the audio data by the various sub-systems.

The synchronization module SYNC may be software in nature.

Alternatively or in parallel, it may include hardware components, either dedicated or shared with other functions of the system SYS.

In addition, in a first configuration, the synchronization module SYNC may be centralized in the system SYS. In other words, it is located in a single place, as opposed to distributed between several locations.

In this first configuration, advantageously, it is located in one of the master device MDi, as shown on FIG. 2. However, it may be located elsewhere, and/or form a stand-alone piece of equipment in communication with the master devices, and in particular with the communication modules COM thereof.

In the example of FIG. 2, the synchronization module SYNC for instance takes the form of a software program located in the memory MEM of the illustrated master device MDi.

In a second configuration, the synchronization module SYNC is distributed between a plurality of locations. Advantageously, it is thus distributed between the sub-systems.

More specifically, in this configuration, the synchronization module SYNC includes a plurality of sub-modules configured to carry out the functionalities detailed below. For instance, each sub-module is then located in one of the master devices MDi.

Regardless of the considered configuration, the synchronization module SYNC is configured to:

obtain respective internal latency data of the sub-systems, the internal latency data of a given sub-system SSi being representative of an internal latency $l_i$ of the sub-system SSi which corresponds to a response time between reception of the audio stream by the sub-system and playback of the audio data by the one or more slave device SSij of the sub-system, based on the internal latency data of the plurality of sub-systems, for each sub-system, determining a respective delay $d_i$ for implementation by said sub-system between reception of the audio data by the master device MDi and playback of the audio data by the slave devices SDij.

It may also be configured to trigger the implementation of the delays, for instance through causing the delays to be sent to their destined sub-system.

The internal latency $l_i$ of a given sub-system SSi is defined as a function of at least the internal latency of the slave device(s) of the sub-system SSi. By "as a function of", it is meant that the obtained value effectively depends on the corresponding parameters.

In an advantageous embodiment, this internal latency $l_i$ is chosen as the maximum value between the respective slave devices. In other words, the internal latency $l_i$ is chosen as the most limiting response time of the slave devices, i.e. the greatest response time between the latter.

In a general configuration, the internal latency of a given sub-system is chosen according to the following relationship (1):

$$l_i = \max_j(l_{ij}) + R_i, \tag{1}$$

where is the internal latency of the slave device SDij, and $R_i$ is a chosen constant which is positive or null. When it is null, the configuration is identical to that above wherein the most limiting response time is chosen.

For instant, a positive constant $R_i$ may be used in configurations in which it is desired to synchronize the sub-system with another device which is external to the system SYS.

As for the delays $d_i$, as indicated above, they are respectively determined as a function of at least the internal latency of the various sub-systems.

The delay $d_i$ associated to sub-system SSi is advantageously destined to be applied between the time of reception of the audio data destined to the sub-system SSi, and the time at which the audio data thus received are sent by the master device MDi to the slave devices SDij, advantageously so that the playback of the audio data of the slave devices is synchronized between the slave devices SDij.

For instance, in an advantageous configuration, the delay $d_i$ of sub-system SSi is determined by the following relationship (2):

$$d_i = \max_j(l_j) - l_i + R_i \tag{2}$$

where R is a chosen constant which is positive or null.

For instance, R is determined as a function of the various constants $R_i$. Alternatively, it is not chosen as depending on the constants $R_i$.

In some embodiments, for instance, a positive constant R may be used in configurations in which it is desired to synchronize the entire system SYS with another device which is external to the system SYS.

Figure 4:
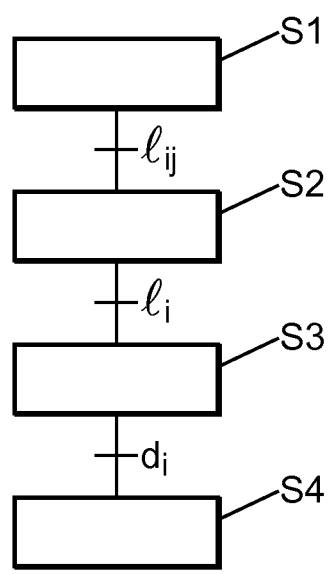
FIG. 4 illustrates a method of synchronizing the system of FIG. 1.

A method according to the invention will now be described in reference to the Figures, in particular FIG. 4.

Initially, the master devices MDi are preferably synchronized. For instance, a known synchronization method is performed to that end, as discussed above.

In a step S1, the system SYS receives to the stream STR of audio data AD sent by the emitter EMI.

As indicated above, the stream STR is thus received by all or part of the master devices MDi. If only a part of them receives it, the stream is forwarded to the master device(s) which does not receive it, for instance by at least one master device MDi which does.

In addition, each sub-system SSi determines its internal latency $l_i$. To this end, one of its components, for instance the master device MDi, proceeds using the relationship (1) above. Alternatively or in parallel, this may be done at least in part by the synchronization module SYNC itself.

This determination is advantageously repeated over time. For instance, it is repeated at regular intervals. Alternatively or in parallel, it is carried out each time a slave device SDij connects to the master device MDi and thus joins the sub-system SSi, or disconnects therefrom.

In case of a connection of a new slave device SDij, the master device MDi determines the internal latency $l_{ij}$ of this device using the database DB, in which it retrieves this information based on the identifier of the slave device obtained during the exchanges carried out for the setup of the communication between the master device and this slave device SDij.

After being determined, the internal latencies are stored in the memory MEM of one or more master device MDi, and/or in a memory that the synchronization module SYNC includes (which may be shared with one master device MDi).

In a step S2, the synchronization module SYNC obtains the internal latency data which are representative of the respective internal latencies $l_i$ of the various sub-systems SSi.

In practice, the internal latencies $l_i$ are retrieved from the memory or memories in which they are stored for usage by the synchronization module SYNC.

In a step S3, the synchronization module SYNC determines, for each sub-system SSi, the delay d to be applied by this sub-system between reception of the audio data destined to it (which may correspond to only part of the audio data AD, as discussed above) via the corresponding stream, and playback of the audio data by the at least one slave device of the sub-system SSi. This determination is carried out based on the internal latencies $l_i$ which have been obtained.

Preferably, this is done using the relationship (2) above.

Once determined, each delay $d_i$ is stored by the corresponding master device MDi in the memory MEM. For instance, it is remotely sent to the master device, typically if the synchronization module SYNC is remote from the corresponding device. Alternatively, for instance, if the synchronization module SYNC is local for the master device MDi, it is directly stored in the memory MEM.

In a step S4, each sub-system SSi applies the corresponding delay for playback of the audio data it receives by the slave devices SSi. Advantageously, as indicated above, this takes the form of the master device delaying the distribution of the audio data to the slave device(s) upon reception of these data for a duration corresponding to the delay $d_i$. Advantageously, and as indicated above, if a sub-system includes a plurality of slave devices, the audio data are then sent to the slave devices by a Bluetooth usage for synchronized playback of these data by the slave devices. This is preferably the case for each sub-system.

For instance, the delay $d_i$ is continuously applied by the corresponding sub-system.

Advantageously, steps S1 to S3 are repeated in time. The repetition is for instance regular, and/or carried out each time a variation of at least one of the internal latency $l_i$ is detected.

The invention presents several advantages. In particular, it improves synchronization of the playback of the audio data, and allows for a very precise synchronization when the master devices are synchronized and each sub-system operates in a synchronized manner internally with respect to the communications between the master device MDi and the slave devices SDij.

Moreover, it does not require heavy computing resources, and can easily be introduced in preexisting systems.

In a further embodiment of the system SYS, at least one master device MDi is also configured to playback all or part of the received audio data. In other words, it also functions as a speaker. In these embodiments, advantageously, the internal latency of the master device MDi for playing back the audio data is taken into account for the determination of the internal latency of the sub-system, for instance using (1).

The invention claimed is:

1. A method of synchronizing a system configured to receive a stream of audio data and playback the audio data, the system including a synchronization module and a plurality of sub-systems, each of the sub-systems including a master device and respective slave devices connected to the master device through a Bluetooth usage, at least one of the master devices including a respective Bluetooth chip configured to create a respective point-to-multipoint link from the Bluetooth chip to the respective slave devices, each of the master devices being configured to receive all or part of the audio data and send the received audio data to the slave devices through said Bluetooth usage for playback by the slave devices, the method comprising:
  obtaining, by the synchronization module, respective internal latency data of the sub-systems, the internal latency data of a respective sub-system of the plurality of sub-systems being representative of an internal latency of the respective sub-system which corresponds to a response time between reception of the audio data by the respective sub-system and playback of the audio data by the slave devices;
  based on the internal latency data of the plurality of sub-systems, determining, by the synchronization module, respective delays each to be applied by the respective sub-system between reception of the audio data and playback of the audio data by the slave devices of the respective sub-system; and
  applying, by each of the sub-systems, the corresponding delay for playback of the audio data;
  wherein the master devices are synchronized together.

2. The method according to claim 1, wherein the system is configured to receive the stream via a Wi-Fi connection.

3. The method according to claim 1, wherein the internal latency of at least one of the sub-systems observes the following relationship:

$$l_i = \max_j(l_{ij}) + R_i,$$

where $l_i$ is the internal latency of the sub-system of index i, $l_{ij}$ is an internal latency of the slave device of index j within the sub-system of index i and which corresponds to a response time of said slave device of index j between reception of the stream of audio data and playback of the audio data by the slave device of index j, and $R_i$ is a constant which is positive or null.

4. The method according to claim 1, wherein the obtaining, the determining, and the applying are repeated overtime, whereby the internal latency data and the delays are updated.

5. The method according to claim 1, wherein, within the respective sub-systems, communications of the audio data to the slave devices are synchronized so that the playback of the audio data by the slave devices is synchronized between the slave devices.

6. The method according to claim 1, wherein, for each of the respective sub-systems, the delay is determined by the relationship:

$$d_i = \max_j(l_j) - l_i + R,$$

where i is the index of the respective sub-system, $d_i$ is the delay of the respective sub-system, $l_j$ is the internal latency of the sub-system of index j, and R is a constant having a positive or null value.

7. A non-transitory computer-readable medium on which is stored a computer program comprising instructions to implement the method according to claim 1 when executed by a processor.

8. A system configured to receive a stream of audio data and playback the audio data, the system comprising:
  a plurality of sub-systems each comprising a master device configured to be connected to slave devices through a Bluetooth usage, at least one of the master devices including a respective Bluetooth chip configured to create a respective point-to-multipoint link from the Bluetooth chip to the respective slave devices, each of the master devices being configured to receive all or part of the audio data and send the received audio data to the slave devices through said Bluetooth usage for playback by the slave devices, wherein the master devices are synchronized together; and
  a synchronization module configured to:
  obtain respective internal latency data of the sub-systems, the internal latency data of a respective sub-system of the plurality of sub-systems being representative of an internal latency of the respective sub-system which corresponds to a response time between reception of the audio data by the respective sub-system and playback of the audio data by the slave devices, and
  based on the internal latency data of the plurality of sub-systems, determine respective delays each to be applied by the respective sub-system between reception of the audio data and playback of the audio data by the slave devices of the respective sub-system,
  wherein the plurality of sub-systems are configured to, by each sub-system, apply the corresponding delay for playback of the audio data.

9. The system of claim 8, wherein all or part of the synchronization module is located in at least one of the master devices.

10. The system of claim 8, wherein the synchronization module includes a plurality of synchronization sub-modules each configured to collect the internal latency data of all the sub-systems and determine the delay of one or more of the sub-systems.

11. The system of claim 8, wherein the synchronization module is located in one place.

12. The system of claim 8, wherein at least one of the sub-systems is remote from the synchronization module, the synchronization module being configured to communicate with the master device of said one sub-system to collect the internal latency data of the one sub-system and to provide the master device with the delay associated to said one sub-system.

13. The method according to claim 2, wherein the internal latency of at least one of the sub-systems observes the following relationship:

$$l_i = \max_j(l_{ij}) + R_i,$$

where $l_i$ is the internal latency of the sub-system of index i, $l_{ij}$ is an internal latency of the slave device of index j within the sub-system of index i and which corresponds to a response time of said slave device of index j between reception of the stream of audio data and playback of the audio data by the slave device of index j, and $R_i$ is a constant which is positive or null.

14. The method according to claim 2, wherein the obtaining, the determining, and the applying are repeated overtime, whereby the internal latency data and the delays are updated.

15. The method according to claim 3, wherein the obtaining, the determining, and the applying are repeated overtime, whereby the internal latency data and the delays are updated.

16. The method according to claim 2, wherein, within the respective sub-systems communications of the audio data to the slave devices are synchronized so that the playback of the audio data by the slave devices is synchronized between the slave devices.

* * * * *